(12) United States Patent
Shitama et al.

(10) Patent No.: US 7,444,158 B2
(45) Date of Patent: Oct. 28, 2008

(54) COMMUNICATION APPARATUS AND METHOD, AND PROGRAM THEREOF

(75) Inventors: Kazuhiro Shitama, Tokyo (JP); Atsushi Onoe, Kanagawa (JP)

(73) Assignee: Sony Corporation, Tokyo (JP)

( * ) Notice: Subject to any disclaimer, the term of this patent is extended or adjusted under 35 U.S.C. 154(b) by 578 days.

(21) Appl. No.: 10/879,028

(22) Filed: Jun. 30, 2004

(65) Prior Publication Data

US 2005/0032535 A1  Feb. 10, 2005

(30) Foreign Application Priority Data

Jul. 16, 2003  (JP) ............................. 2003-275100

(51) Int. Cl.
*H04B 7/00* (2006.01)
*H04Q 7/20* (2006.01)

(52) U.S. Cl. .................... 455/512; 455/513; 455/552.1; 455/452.2

(58) Field of Classification Search ................. 455/517, 455/512, 513, 435.3, 435.2, 11.1, 9, 67.11, 455/67.13, 133, 134, 135, 166.2, 552.1, 550.1, 455/226.1, 226.2, 41.1, 41.2, 418, 452.1, 455/452.2; 370/395.42, 333, 395.2
See application file for complete search history.

(56) References Cited

U.S. PATENT DOCUMENTS 7,003,315 B2 *  2/2006  Kiyomoto et al. ........ 455/552.1
7,120,129 B2    10/2006  Ayyagari et al.
2002/0123340 A1 *  9/2002  Park .......................... 455/424
2002/0193112 A1 * 12/2002  Aoki et al. ................. 455/437
2003/0139136 A1 *  7/2003  Pattabiraman ............. 455/41.2

FOREIGN PATENT DOCUMENTS

| JP | 7-307971 | 11/1995 |
| JP | 10-178429 | 6/1998 |
| JP | 11-205342 | 7/1999 |
| JP | 2001-308866 | 11/2001 |
| JP | 2002-112347 | 4/2002 |
| JP | 2002-252620 | 9/2002 |
| JP | 2002-344458 | 11/2002 |

* cited by examiner

*Primary Examiner*—John J. Lee
(74) *Attorney, Agent, or Firm*—Oblon, Spivak, McClelland, Maier & Neustadt, P.C.

(57) ABSTRACT

In order to easily and promptly make a connection to a station which a user desires and in a good communication condition, there is provided a communication apparatus applicable to a PDA having a wireless communication function, which includes setting means for setting a priority order of wireless communication stations, acquisition control means for controlling acquisition of RSSI (Receive Signal Strength Indication) of each of the stations, and connection control means for controlling a connection to one of the station having a highest priority order among the stations whose RSSI exceeds a predetermined threshold.

9 Claims, 11 Drawing Sheets

COMMUNICATION APPARATUS AND METHOD, AND PROGRAM THEREOF

CROSS REFERENCES TO RELATED APPLICATIONS

The present document is based on Japanese Priority Document JP 2003-275100, filed in the Japanese Patent Office on Jul. 16, 2003, the entire contents of which being incorporated herein by reference.

BACKGROUND OF THE INVENTION

1. Field of the Invention

The present invention relates to a communication apparatus and a method, and a program thereof, more specifically to a communication apparatus and a method for enabling a user to perform wireless communication with a desired station and a program thereof.

2. Description of Related Art

Recently, a large number of PDA's (Personal Digital Assistants), which are portable information processing units, are provided with a wireless communication function.

In a conventional system, preference or profile setting of a designated user is checked to determine a particular wireless network among many available competing wireless networks and a particular type of certification for the connection (see, for example, Patent Document 1). In this system, the user is able to set in an automatic mode to prioritize either an infrastructure mode or an ad hoc mode. In the infrastructure mode priority setting, if the user has been active in offline or in the ad hoc mode, the system is capable of automatically detecting a newly available infrastructure wireless network for transfer to the network.

Alternatively, in a case of making the system connectable to either one of a plurality of networks which employ different communication systems and performing communication with either one of such communication networks, proposed is a technique of selecting an optimum wireless transmission path whenever need arises among wireless transmission paths between wireless base stations on the basis of a designated wireless transmission path selection standard (see, for example, Patent Document 2).

(Patent Document 1)
Japanese Patent Application Publication 2002-344458

(Patent Document 2)
Japanese Patent Application Publication 2002-112347

SUMMARY OF THE INVENTION

A conventional system which checks preference or profile setting of the defined user to determine the particular wireless network among many available competitive wireless networks employs a technique for automatically making connection to the particular network among competitive wireless networks at various locations such as at home, a workplace, an airport and the like.

Unfortunately, since choices in an automatic connection are restricted to such rough settings as "infrastructure mode priority" and "ad hoc mode priority", it is therefore impossible to make a connection to a particular destination with which the user desires to communicate.

Moreover, since it is in the premise that the connection can be discovered by scanning, it is therefore impossible to make connection to any access point which cannot be scanned. Recently, there are some instances that settings are made to hide SSID (Service Set Identifier) in any access point such as a hotspot or the like so as not to be discovered by scanning for the purpose of enhanced security, such access points cannot be connected if scanning is prerequisite.

The technique for choosing the optimum wireless transmission path whenever need arises on the basis of the designated wireless transmission path selection standard is to make a connection to any access point with better communication conditions by taking communication conditions (such as RSSI (Receive Signal Strength Indication) or the like) into consideration.

However, since user's policy is not taken into consideration at all in this technique, there is a possibility that connection is made to a station that the user does not want to. For example, it is assumed that there are two accessible access points in the neighborhood, one is an access point A which is a charge-free hotspot while the other is an access point B which is a pay-service hotspot. In this case, even if the access point B has better communication conditions than the access point A, there may be a possibility that the user wants to make a connection to the free access point A if the communication conditions of the free access point A exceed the minimum standard level. However, in such a case, the system makes the connection to the access point B on contrary to the user's desire.

The communication apparatus according to the present invention comprises setting means for setting a priority order of wireless communication stations, acquisition control means for controlling acquisition of RSSI of each of the stations, and connection control means for controlling a connection to one of the stations having a highest priority order among the stations of which RSSI exceed a predetermined threshold.

The setting means further sets whether or not an automatic connection can be made for each of the stations and the connection control means controls for making a connection to one of those stations with a highest priority order, to which the automatic connection is permitted by a setting and whose RSSI exceed the predetermined threshold.

In a case where there is no station which exceeds the predetermined threshold in RSSI, the connection control means can control to connect to a station with a highest RSSI.

In a case where there is no station whose RSSI exceeds the predetermined threshold, the connection control means can control to connect to a station with a highest priority order among the stations which RSSI have been acquired.

In a case where a particular station is designated, the acquisition control means controls to acquire RSSI of the designated station, and the connection control means makes a connection to the designated station.

The acquisition control means is capable of controlling the acquisition of RSSI of all stations at one time.

The acquisition control means is capable of controlling the acquisition of RSSI of the stations in accordance with the priority order.

The communication method according to the present invention includes a setting step of setting the priority order of wireless communication stations, an acquisition control step of controlling acquisition of RSSI of stations, and a connection control step of controlling connection to the station with higher priority order among the stations each of whose RSSI exceeds the predetermined threshold.

The program according to the present invention is to instruct a computer to execute a setting step for setting the priority order of wireless communication stations, an acquisition control step for controlling the acquisition of RSSI of the stations and a connection control step for controlling connection to the station with higher priority order among the stations each of whose RSSI exceeds the predetermined threshold.

The communication apparatus may be a separate device or a block performing communication processing.

In the communication apparatus and method and the program thereof according to the present invention, the priority order of wireless communication stations is set and RSSI of the stations are acquired. Then, connection is made to the station with higher priority order among the stations which exceed the designated threshold in RSSI.

Connection can be made simply and promptly to the station with the best communication conditions among the stations that the user desires to be connected.

BRIEF DESCRIPTION OF THE DRAWINGS

The above and other objects, features and advantages of the present invention will become more apparent from the following description of the presently preferred exemplary embodiments of the invention taken in conjunction with the accompanying drawings, in which.

DESCRIPTION OF THE PREFERRED EMBODIMENTS

Now, embodiments of the present invention will be described hereunder. Firstly, the relationship between the inventions as disclosed in this specification and the embodiments of the present invention will be exemplified as follows. This description is intended to confirm that the embodiments supporting the invention as defined in this specification are disclosed in this specification. Accordingly, even if description is made as embodiments of the present invention, but any embodiment is not described to correspond to this invention, such fact does not mean that the embodiment does not correspond to that invention. Conversely, even if it is described herein that any embodiment corresponds to this invention, such fact does not mean that the embodiment does not correspond to any invention other than that invention.

Moreover, this description does not mean the entire inventions as disclosed in this specification. In other words, this description does not negate existence of any invention which is disclosed in this specification but not claimed in this application, i.e., existence of any invention which may show up in future by a divisional application, an amendment or an addition.

Figure 7:
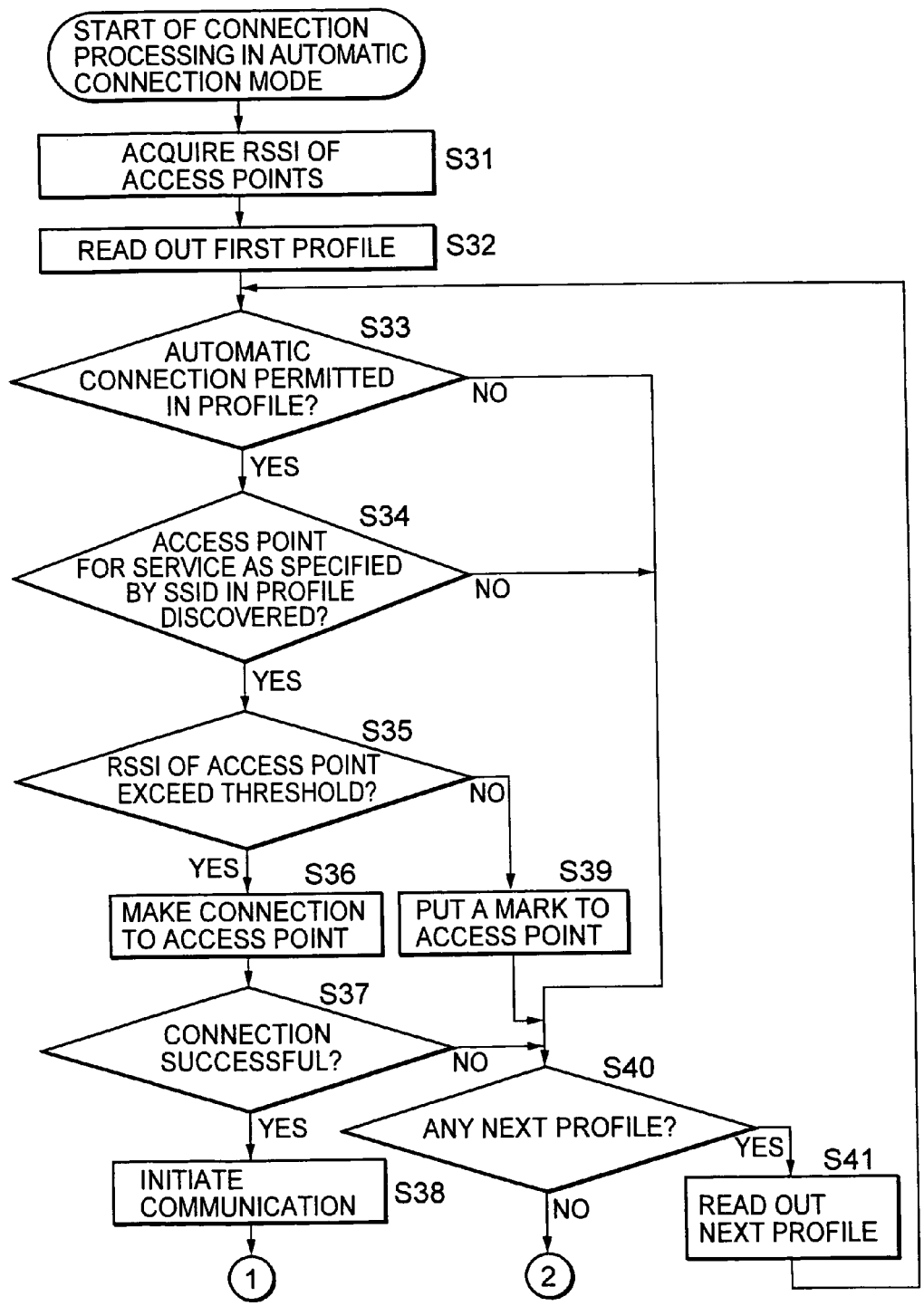
FIG. 7 is a flowchart for precisely explaining the connection processing in the automatic connection mode.
Figure 8:
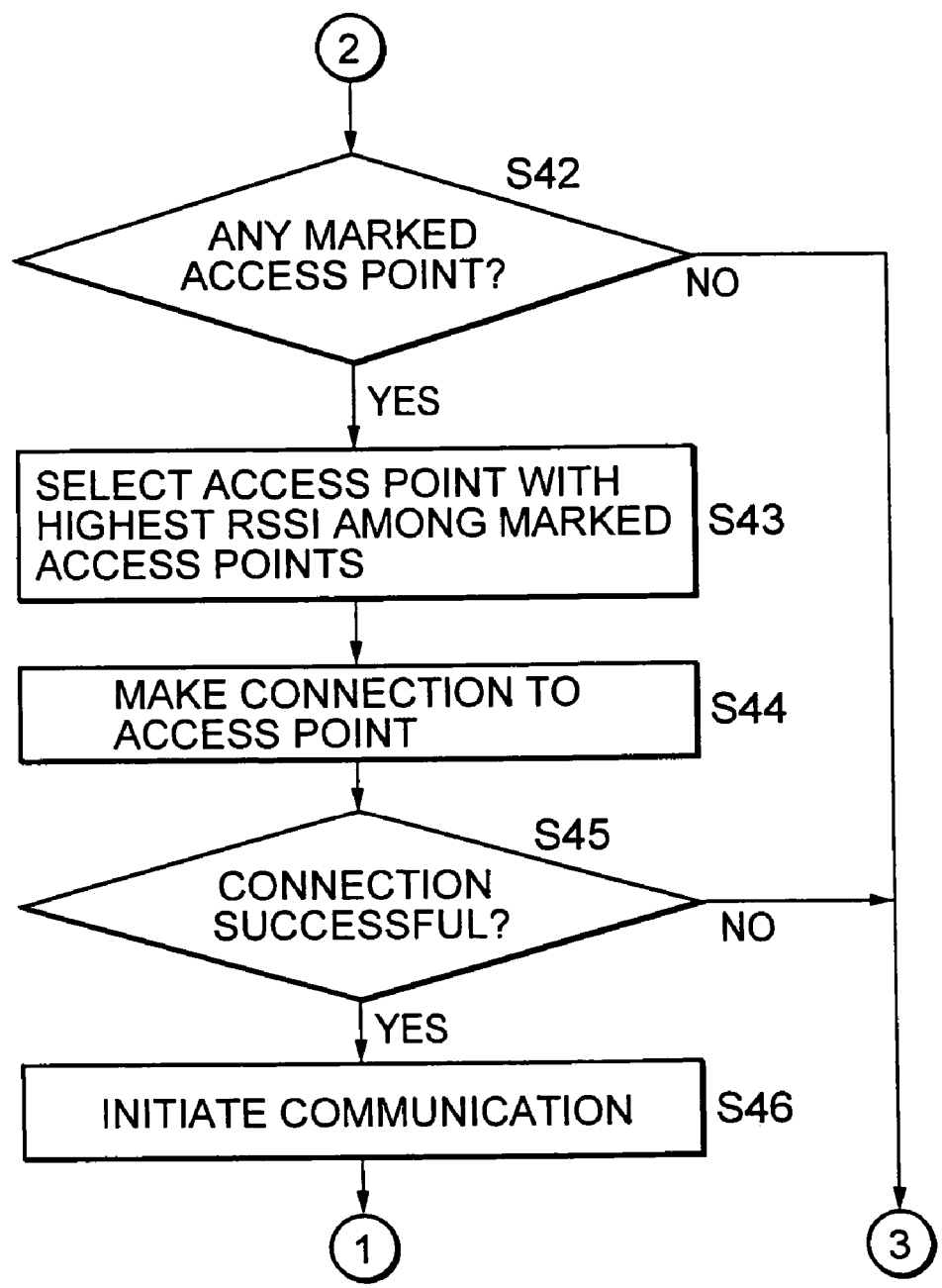
FIG. 8 is a flowchart for precisely explaining the connection processing in the automatic connection mode.
Figure 9:
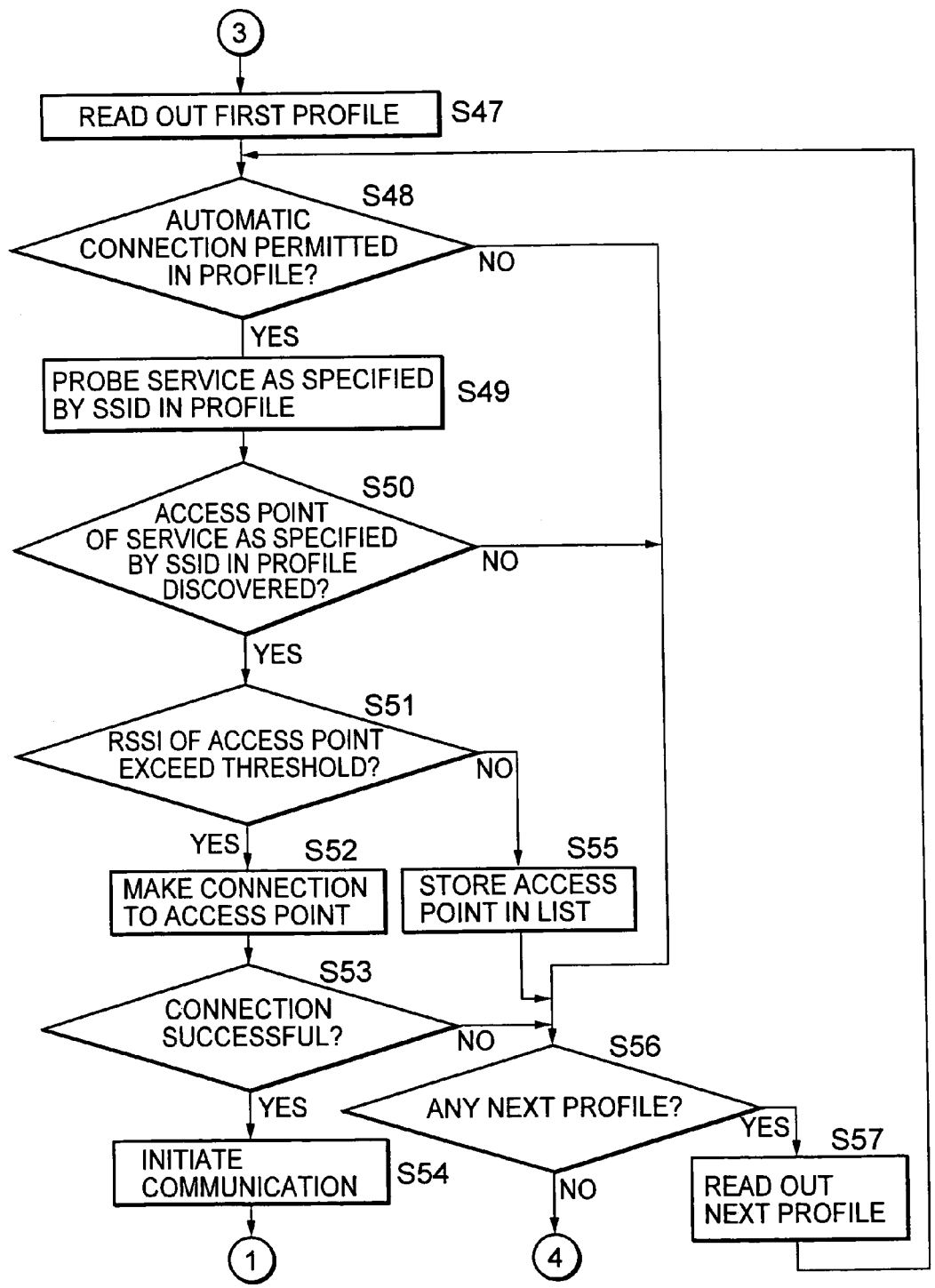
FIG. 9 is a flowchart for precisely explaining the connection processing in the automatic connection mode.
Figure 10:
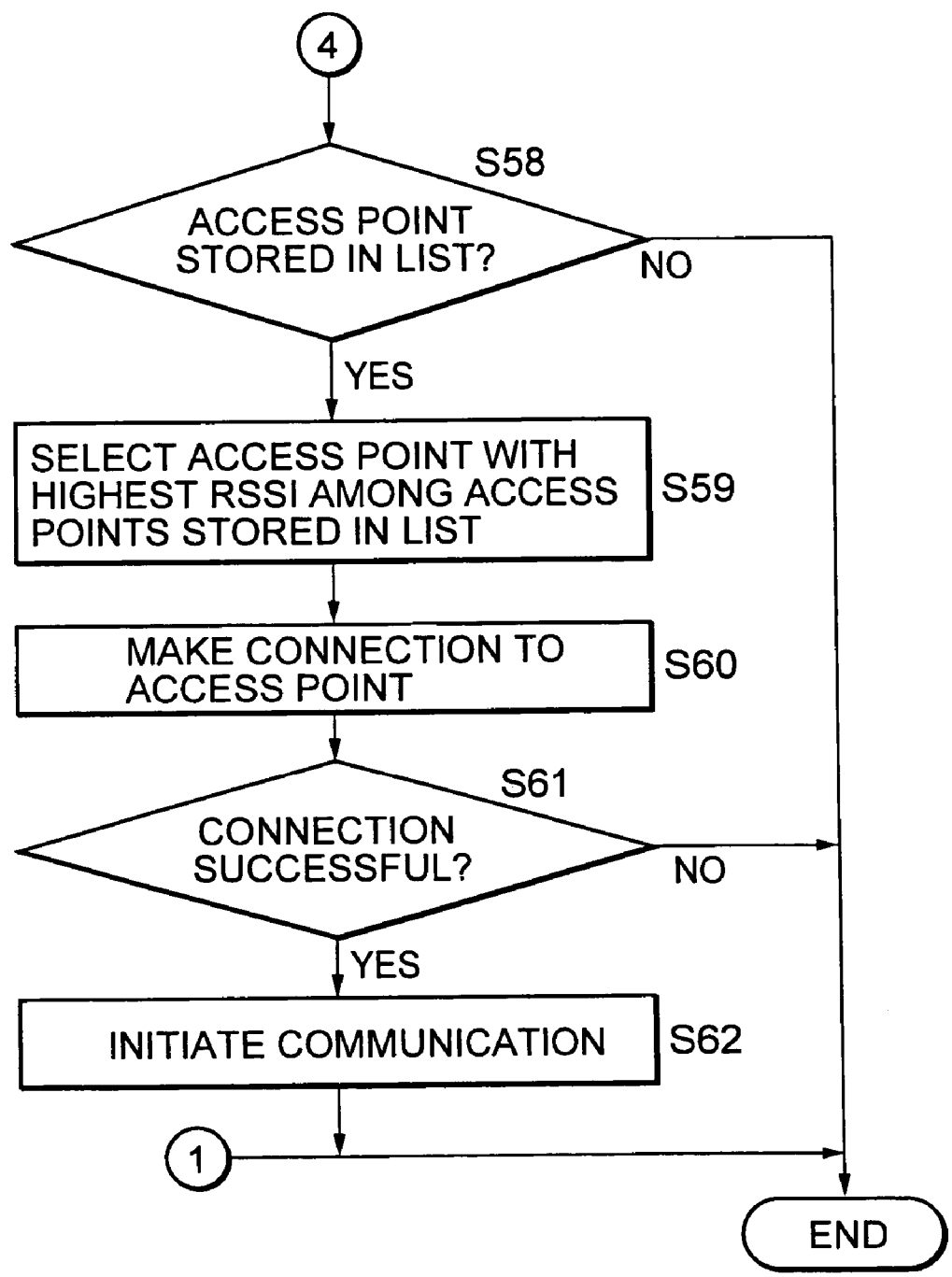
FIG. 10 is a flowchart for precisely explaining the connection processing in the automatic connection mode.

A communication apparatus according to the present invention includes setting means (for example, a CPU 11 in FIG. 1 for performing a process in step S3 in FIG. 3) for setting a priority order of wireless communication stations (for example, an access point 111-1-1 in FIG. 2), acquisition control means (for example, the CPU 11 in FIG. 1 for performing a process in step S31 in FIG. 7), and connection control means (for example, the CPU 11 in FIG. 1 for performing the processes in steps S32 through S38 in FIG. 7) for controlling connection to a station with higher priority order among the stations which exceed the designated threshold in RSSI.

Figure 1:
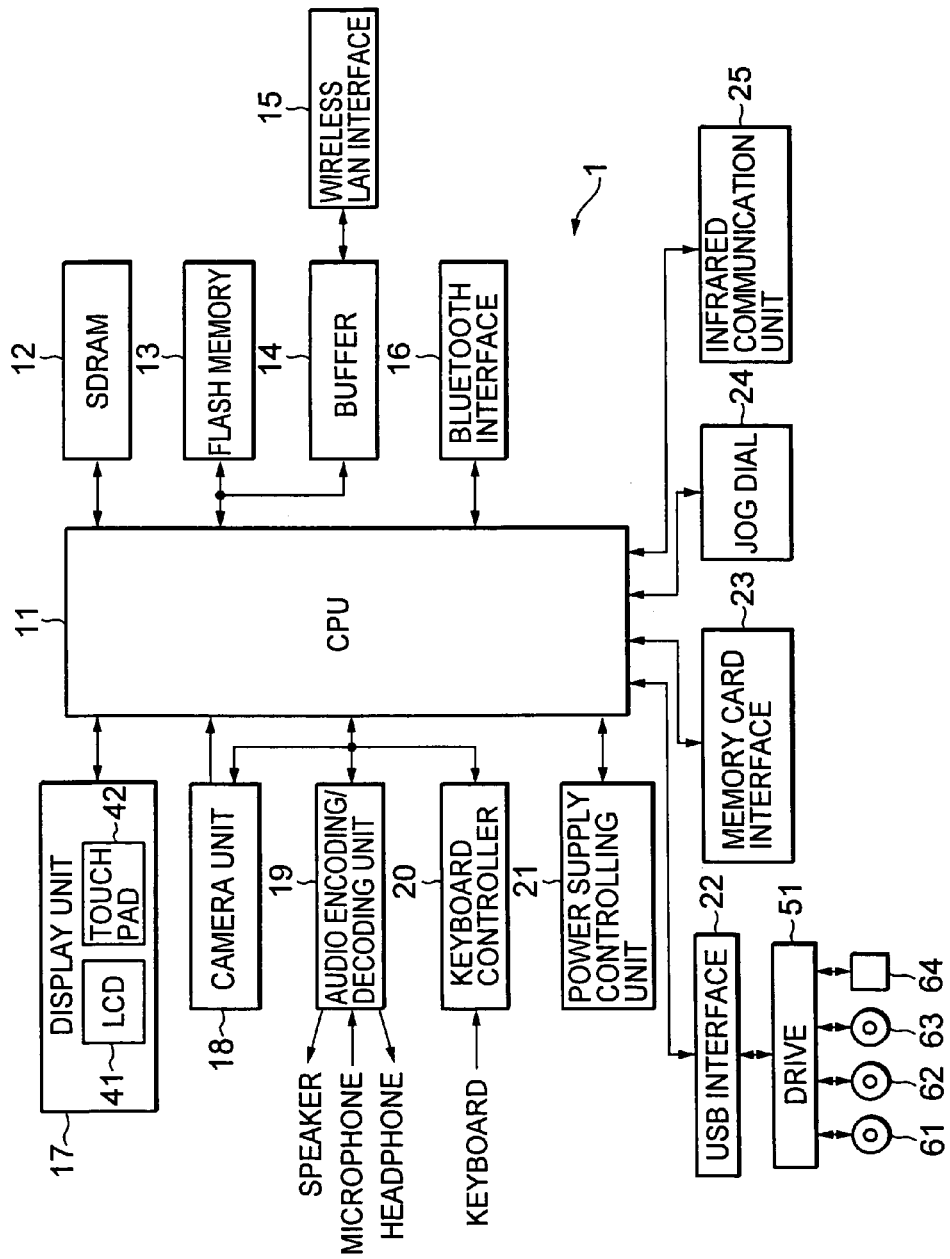
FIG. 1 is a block diagram showing a structure of an embodiment of a PDA according to the present invention.

FIG. 1 is a block diagram for showing the construction of one embodiment of a PDA 1 according to the present invention. A CPU (Central Processing Unit) 11 executes various programs such as an operating system which is stored in an SDRAM (Synchronous Dynamic Random Access Memory) 12 or a flash memory 13, application programs, class libraries and the like.

The SDRAM 12 stores programs to be executed by the CPU 11 or parameters which change time to time depending on the execution of the CPU 11. The flash memory 13 is a kind of EEPROM (Electrically Erasable Programmable Read Only Memory) and generally stores basically fixed data among parameters in the programs and operation parameters to be used by the CPU 11.

Connected to the CPU 11 by way of the flash memory 13 and a common bus is a buffer 14. A wireless LAN interface 15 is connected to the CPU 11 by way of the buffer 14. The wireless LAN interface 15 performs wireless communication with another unit or access point, which is one example of stations, on the basis of the standard such as IEEE (Institute of Electrical and Electronic Engineers) 802.11a, IEEE802.11b, IEEE802.11g or the like for sending and receiving data, commands and the like. The buffer 14 temporarily stores data which are supplied from the CPU 11 and transmitted by the LAN interface 15 or temporarily stores data which are received by the wireless LAN interface 15 and to be supplied to the CPU 11.

A Bluetooth interface 16 performs wireless communication with other apparatus on the basis of the Bluetooth standard for sending and receiving data, commands and the like.

A display unit 17 comprises an LCD (Liquid Crystal Display) 41 and a touch pad 42. In accordance with the data supplied from the CPU 11, the LCD 41 displays icons, thumbnails, texts or other images. The touch pad 42 is disposed in lamination with the LCD 41.

For example, the display unit 17 reads the data in video memory area which is allocated in the designated addresses of the SDRAM 12 at the designated timing by the CPU 11 and images are displayed on the LCD 41 in accordance with the read-out data.

It is to be noted that the display unit 17 is not restricted to the LCD 41 but may be any other thin display unit such as an organic EL (Electro Luminescence) display unit or the like.

The touch pad 42 supplies data corresponding to the pushed-down position by the instruction operation (for example, the coordinate data at the pointed position) to the CPU 11. The user is capable of inputting the designated data or operation instructions into the PDA 1 by pushing down the touch pad 42 stacked on the LCD 41 by a finger, a pen or the like.

It is to be noted that the display unit 17 is not restricted to the touch pad 42 which senses pressure due to push-down operation but may be other input devices for electromagnetically detecting the position such as, for example, a digitizer, a tablet or the like. It is also possible to connect a mouse to the PDA 1 by way of a USB (Universal Serial Bus) interface 22 so that the PDA 1 can acquire position instructions by the mouse.

A camera unit 18 is a camera which employs a CCD (Charge Coupled Device) or a CMOS (Complementary Metal-Oxide Semiconductor) sensor as a light receiving element and picks up still images or animated images and the image data which are acquired by the image pick-up is supplied to the CPU 11.

An audio encoding/decoding unit 19 decodes the audio data encoded and supplied from the CPU 11 under control of the CPU 11 and converts the data into an analog audio signal which is then supplied to a speaker or a headphone. Under control of the CPU 11, the audio encoding/decoding unit 19 also converts the analog audio signal supplied from a microphone into the digital data and encodes the resulting audio data before being supplied to the CPU 11.

A keyboard controller 20 controls a keyboard. The data corresponding to a signal from the keyboard is supplied to the CPU 11. A power supply control unit 21 monitors the voltage and the like of the power supply which is supplied from a battery or an AC (Alternating Current) adapter connected thereto (not shown) and controls the power supply which is required by the all units from the CPU 11 to an infrared communication unit 25.

The USB (Universal serial Bus) interface 22 is an interface for making connection to USB devices in conformity with the USB standard. For example, connected to the USB interface 22 is a drive 51 which is a USB device. Data or programs from the connected drive 51 are inputted and data supplied from the CPU 11 is supplied to the drive 51.

The drive 51 reads out data or programs from a magnetic disk 61, an optical disc 62, a magneto optical disc 63 or a semiconductor memory 64 which is connected to the drive 51 as necessary. Such data or programs are supplied to the CPU 11 or the SDRAM 12 by way of the USB interface 22. Also, the drive 51 stores data or programs into the magnetic disk 61, the optical disc 62, the magneto optical disc 63 or the semiconductor memory 64 which is connected to the drive 51.

A memory card interface 23 acquires programs or data which are supplied from a memory card to be installed in a memory card slot, which is not shown, and supplies various data which are supplied from the CPU 11 to the installed memory card.

A jog dial 24 supplies a signal corresponding to rotation operation or pushing operation by the user to the CPU 11. For example, when icons, thumbnails, texts or the like which are displayed on the display unit 17 is to be selected by the user, the jog dial 24 is rotated or pushed toward a main body. For example, when the jog dial 24 is rotated while a plurality of icons are displayed on the display unit 17, a desired one of the plurality of icons can be selected and the selected icon is determined when the jog dial 24 is pushed toward the main body. And in a case where the determined icon corresponds to an application program, the application program is initiated.

The infrared communication unit 25 sends the data which is supplied from the CPU 11 to another apparatus as an infrared signal and the data corresponding to a received infrared signal is then supplied to the CPU 11.

Figure 2:
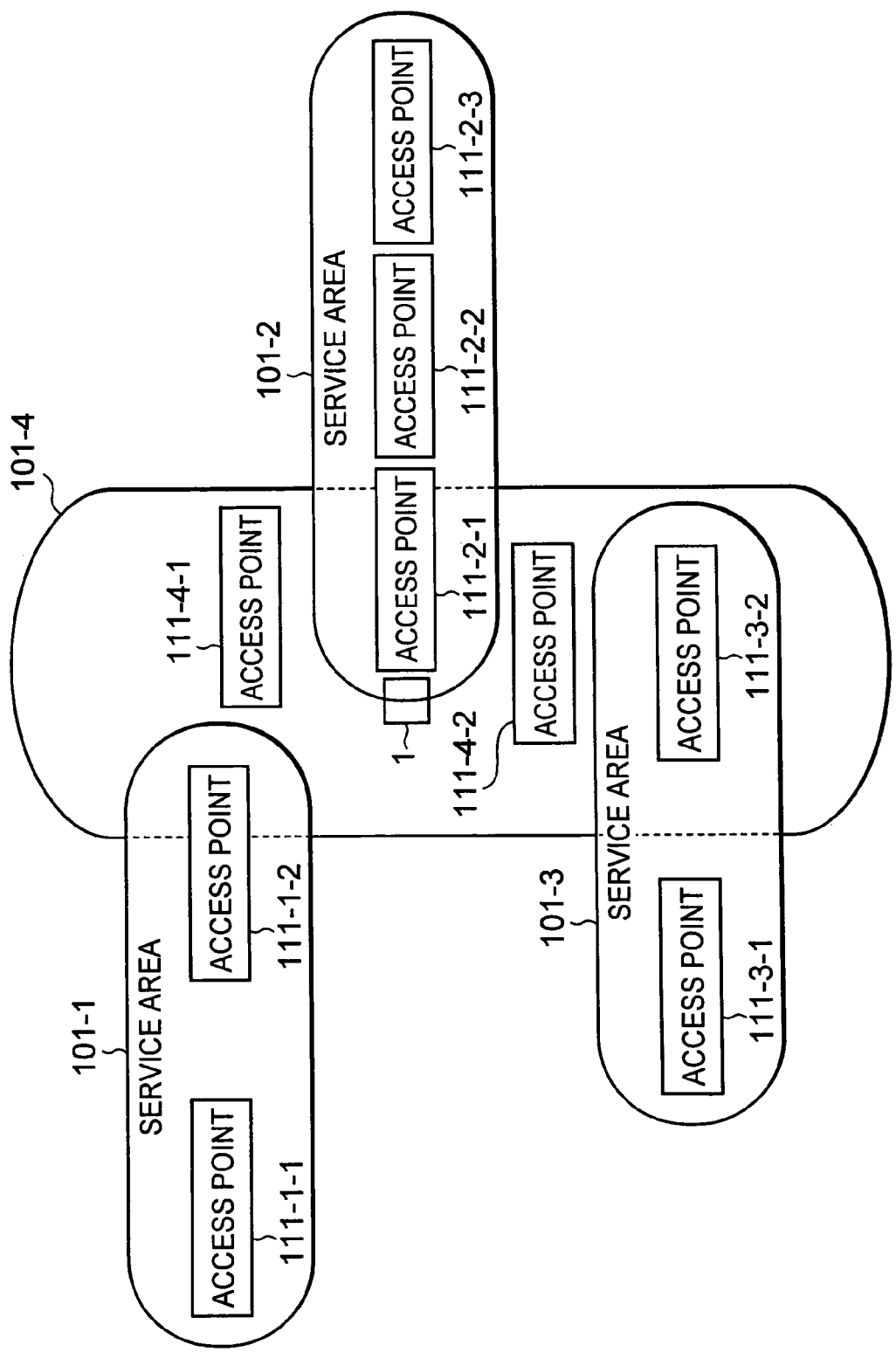
FIG. 2 is a view showing relationship between the PDA 1 and an access point, an example of a wireless communication station.

FIG. 2 is an illustration to describe the relationship between the PDA 1 and access points which are examples of wireless communication stations. Service areas 101-1 through 101-4 indicate areas (service providing areas) capable of performing wireless communication such as so-called hotspots and the like and capable of providing wireless communication services by the provider within each area. The service areas 101-1 through 101-4 are respectively distinguishable by different SSID (Service Set ID).

There are provided access points 111-1-1 and 111-1-2 in the service area 101-1 which is an example of wireless communication stations. In other words, the access points 111-1-1 and 111-1-2 establish the service area 101-1 as a wireless communication area.

Similarly, there are provided access points 111-2-1 through 111-2-3 in a service area 101-2. The access points 111-2-1 through 111-2-3 establish the service area 101-2 as a wireless communication area. There are provided access points 111-3-1 and 111-3-2 in a service area 101-3. The access points 111-3-1 and 111-3-2 establish the service area 101-3 as a wireless communication area. There are provided access points 111-4-1 and 111-4-2 in a service area 101-4. The access points 111-4-1 and 111-4-2 establish the service area 101-4 as a wireless communication area.

When the PDA 1 enters the area of the service area 101-1, it is capable of receiving wireless communication services in the service area 101-1. Concretely, when the PDA 1 enters the service area 101-1, it is capable of communicating with either one of the access points 111-1-1 and 111-1-2, thereby capable of receiving wireless communication services for receiving data or sending data.

Similarly, when the PDA 1 enters the area of either one of the service areas 101-2 through 101-4, it is capable of receiving wireless communication services of either one of the service areas 101-2 through 101-4.

In areas where the service areas 101-1 through 101-4 overlap, the PDA 1 is capable of receiving services from either one of the service areas 101-1 through 101-4. In a case where the PDA 1 is located, for example, in the area where the service areas 101-2 and 101-4 overlap, it is possible to receive services from either one of the service areas 101-2 and 101-4.

The PDA 1 receives the services from either one of the service areas 101-1 through 101-4 in accordance with the priority order which is set by the user and communication conditions. That is, the PDA 1 is connected to either one of the access points 111-1-1 through 111-4-2 in accordance with the user's preference order and the strength of the radio waves.

For example, the PDA 1 manages the list of each profile (connection settings) of the services with priority order on the basis of the user's judgment (requirements). And at the time of making connection, the PDA 1 attempts to make a connection sequentially from the higher rank (higher priority order) in the list. Here, the list is an example of collection of prioritized profiles.

For example, if any high ranked service station is not discovered or if RSSI is lower than the reference value (threshold), the PDA 1 reserves connection to such service and tries to connect to a lower ranked (lower priority order) service.

Furthermore, if settings included in a profile are changed, for example, by the user's judgment, without removing the profile, the PDA 1 eliminates the services corresponding to the designated profile in the list as candidates for connection and avoids connection to the service stations.

In the above manner, the PDA 1 is capable of making connection to a service providing station with improved flexibility by taking the user policy and the communication conditions (RSSI) into consideration.

It is to be noted hereunder that the access points 111-1-1 through 111-4-2 are simply referred to as the access points 111 if there is no need to distinguish them individually.

Figure 3:
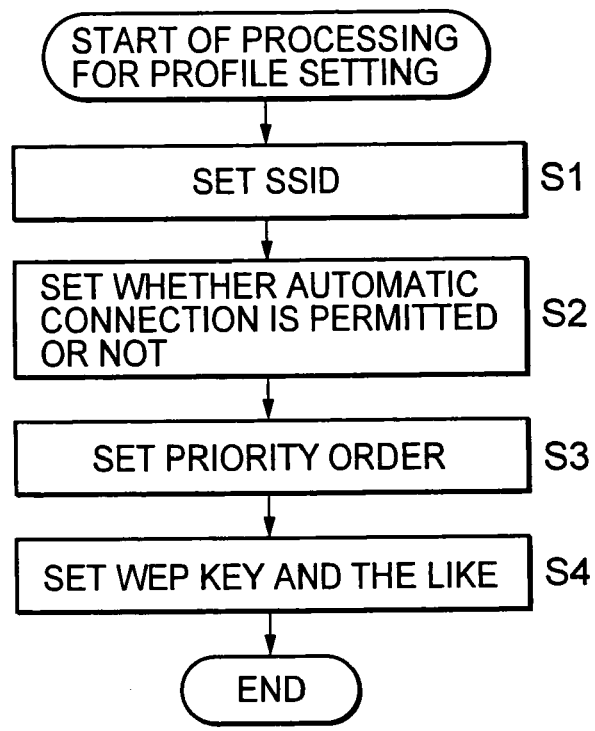
FIG. 3 is a flowchart for explaining a process of setting a profile.

FIG. 3 is a flowchart for describing the profile setting processing by the PDA 1 which executes the communication control program. Although the detailed description will be made hereinafter, the profile is data relating to the stations to which the user wants to be connected.

In step S1, the communication control program sets SSID in the profile. For example, the communication control program acquires SSID in accordance with the signal from the touch pad 42, the keyboard or the like operated by the user and the acquired SSID is recorded in the profile. In this case, if the existing profile is to be changed, SSID is set by changing the SSID in the profile while, in a case of generating a new profile, SSID is set by recording such SSID in the newly generated profile.

Figure 4:
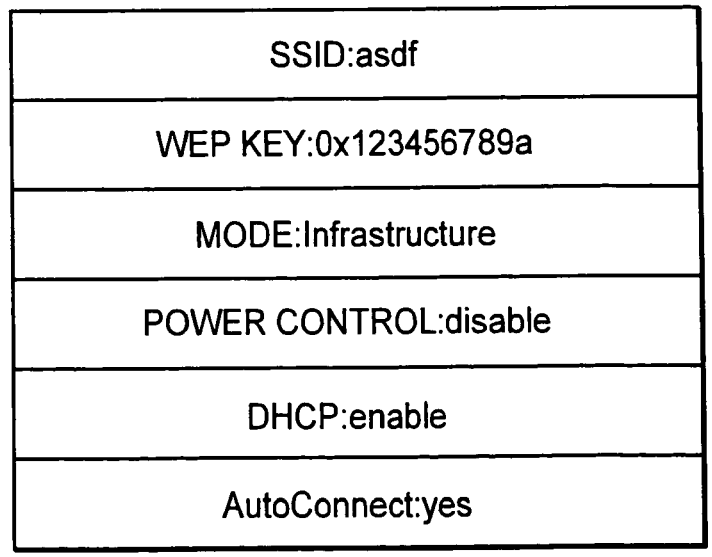
FIG. 4 is a view showing an example of the profile.

FIG. 4 is an example of the profile. Concretely, the profile is recorded in, for example, the flash memory 13.

The profile includes, for example, SSID or an automatic connection setting. The automatic connection setting is a setting to indicate yes or no of automatic connection to the service station which is specified by SSID saved in the profile. For example, if the automatic connection setting is "yes", it indicates that automatic connection to the station of the particular SSID saved in the profile is permitted. On the other hand, if the automatic connection setting is "no", automatic connection to the station of the particular SSID saved in the profile is prohibited.

Moreover, the profile includes data necessary for making connection of the PDA 1 such as, for example, a WEP (Wired Equivalent Privacy) KEY, a mode setting, a power control setting, a DHCP (Dynamic Host Configuration Protocol) setting and the like. The WEP KEY is, for example, a 128 bits key which is used for encryption encoding/decoding. The mode setting sets either the infrastructure mode or the ad hoc mode. If the mode setting is the infrastructure mode, the PDA 1 tries to make connection to the access point 111 which is one example of the stations. On the other hand, if the mode setting is the ad hoc mode, the PDA 1 tries to make connection to a wireless terminal which has generated an ad hoc network (IBSS (Independent Basic Service Set)). The wireless terminal is not the access point 111 but is one example of other stations.

The power control setting shows whether or not a power saving mode is in existence. The DHCP setting shows whether or not the setting information of TCP/IP (Transmission Control Protocol/Internet Protocol), for example, an IP address or the like is to be received from a server by using DHCP. If the DHCP setting is set not to use DHCP, the IP address or the like is set.

It is to be noted that the profile may save data relating to communication, for example, those to be used in communication after making connection to the station such as a proxy server setting, an electronic mail setting and the like.

Returning again to FIG. 3, in step S2, the communication control program sets yes or no of the automatic connection in the profile. For example, the communication control program sets "yes" or "no" as the automatic connection setting in its profile based on the signal from the touch pad 42, the keyboard or the like which is operated by the user.

If "no" is set as the automatic connection setting in the profile in accordance with the user's operation, in the connection processing in the automatic connection mode which will be described hereinafter, the PDA 1 does not make connection to the station as specified by SSID in the profile. As a result, the PDA 1 can be connected to the station in accordance with the user's convenience.

For example, if the user is in outdoors, by only changing automatic connection setting, the user is capable of eliminating the access point at home from the candidates of automatic connection or excluding pay-service hotspot services from the candidates of automatic connection in a case of tight budget.

Figure 5:
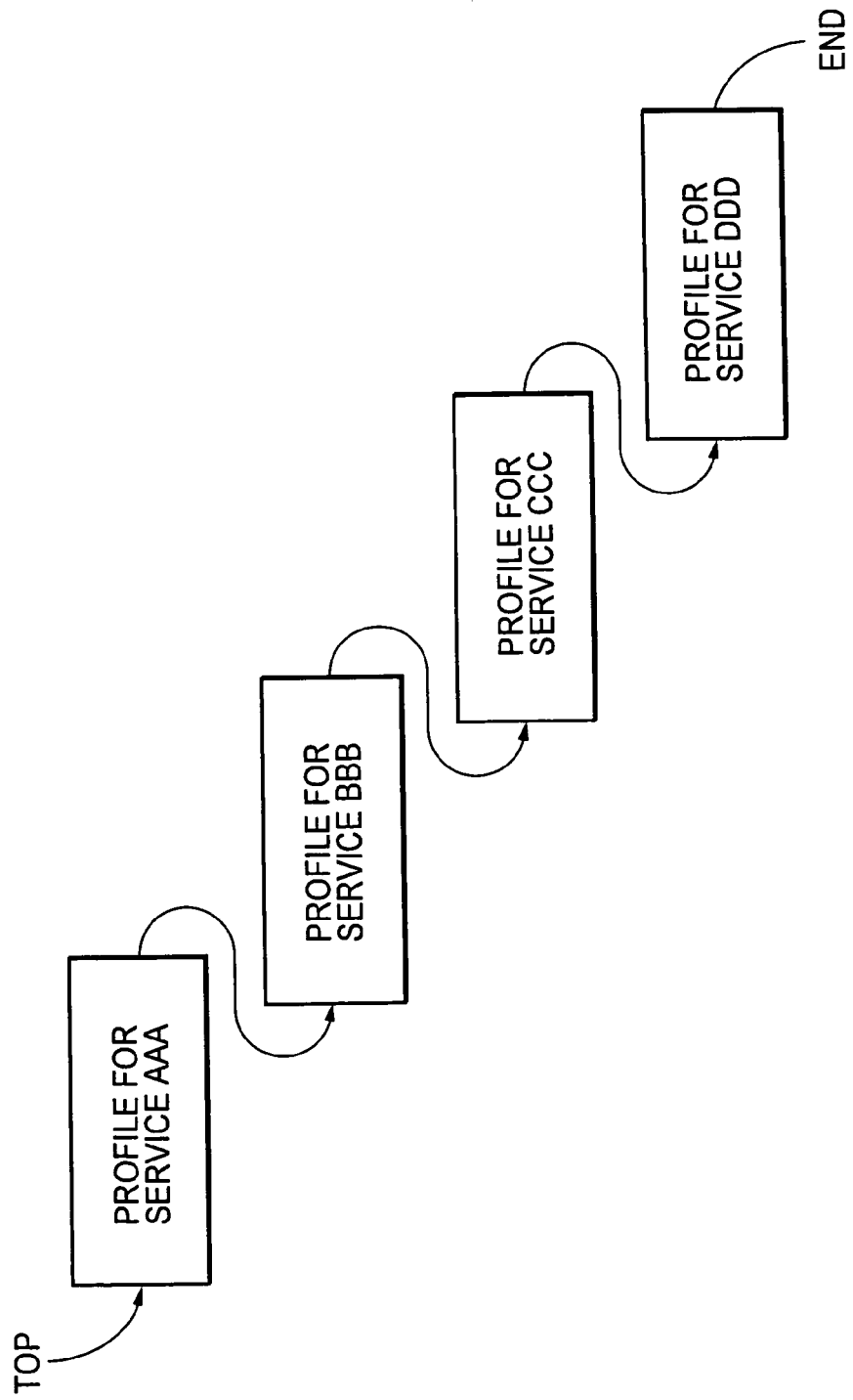
FIG. 5 is a view showing an example of a priority order of the profile.

In step S3, the communication control program sets the priority order. For example, as shown in FIG. 5, the profile has a pointer which shows the priority order. In the particular example as shown in FIG. 5, the TOP pointer which shows the start appoints the profile for a service AAA and the pointer of the service AAA appoints the profile for a service BBB. The pointer of the profile for the service BBB appoints the profile for a service CCC and the pointer of the profile for the service CCC appoints the profile for a service DDD. And saved in the pointer of the profile for the service DDD is END which indicates the end. That is, in this case, the priority order is set to the sequence of the profile for the service AAA, the profile for the service BBB, the profile for the service CCC and the profile for the service DDD.

The priority order of the profile for the service AAA, the profile for the service BBB, the profile for the service CCC and the profile for the service DDD indicates the priority order of the stations indicated in the respective profiles.

For example, in step S3, the communication control program sets the priority order of the profiles, i.e., the priority order of the stations by editing the pointers in accordance with the signal from the touch pad 42, the keyboard or the like by the user.

It is to be noted that the priority order is not necessarily indicated by the pointers but may be indicated by employing any desired method as long as the sequence can be distinguishably recognized by, for example, recording the sequence of the profiles at the designated addresses in the flash memory 13 so that the sequence of the recording is the priority order, by storing the priority order setting data in each profile or the like.

In step S4 in FIG. 3, the communication control program completes the profile setting procedure by setting data such as the WEP KEY of the profile and the like which are to be used in communication and stored in each profile.

In the above manner, the priority order of the stations can be set to reflect the user's intention by processing the profile settings.

The PDA 1 makes a connection to the stations such as the access points 111 on the basis of the profiles. In accordance with the user's instructions, the PDA 1 can select either the automatic connection mode or the designated connection mode.

Figure 6:
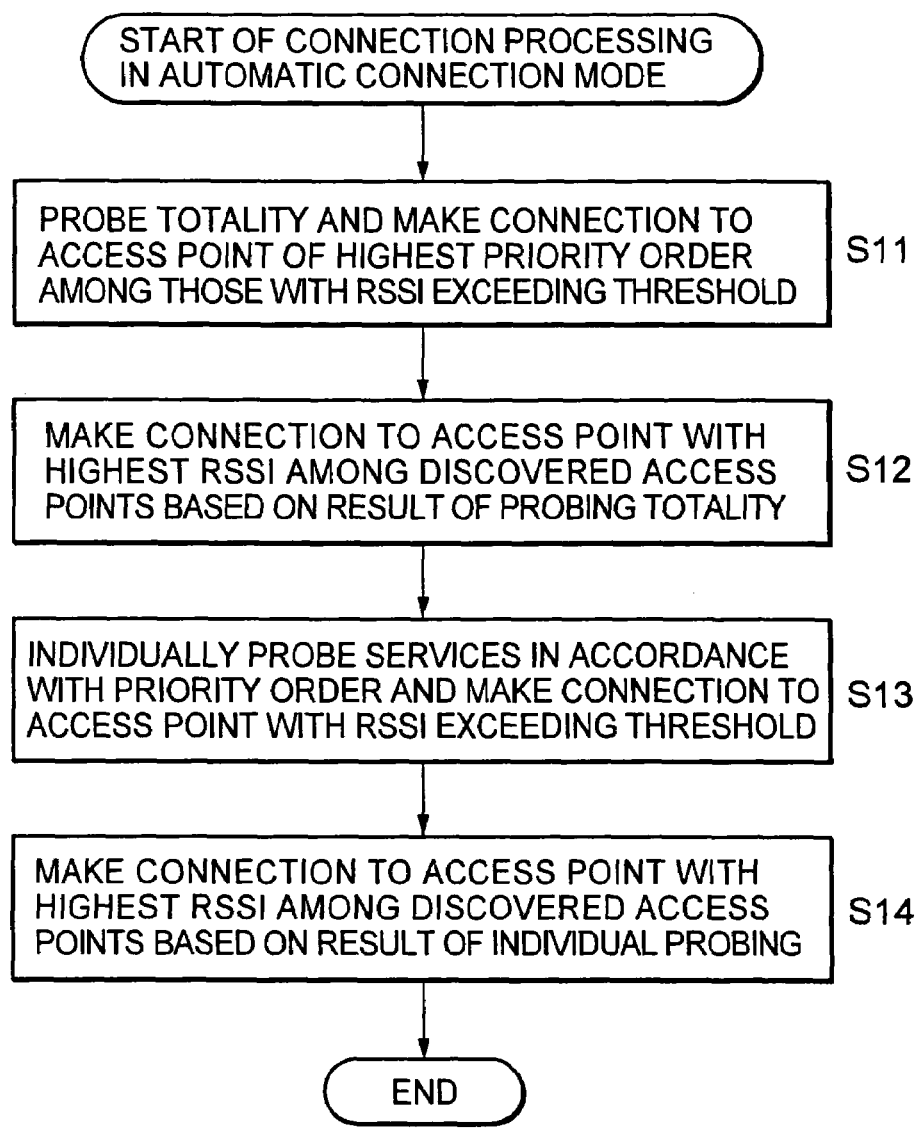
FIG. 6 is a flowchart for explaining outline of a connection processing in an automatic connection mode.

FIG. 6 is a flowchart for describing an outline of a connection processing in the automatic connection mode in the PDA 1 which executes the communication control program. In step S11, the communication control program probes the totality and makes connection to the access points 111 with a higher priority order among the access points whose RSSI exceed the threshold (for example, the prerecorded threshold).

If connection is failed in the process in step S11, the communication control program makes connection to the access point 111 with the highest RSSI among the discovered access points 111 on the basis of the result of probing the totality (i.e., the access points from which RSSI have been acquired) in step S12.

If connection is failed in the process in step S12, the communication control program individually performs probing the services in the priority order and makes connection to any access point whose RSSI exceeds the threshold (for example, the prerecorded threshold) in step S13.

If connection is failed in the process in step S13, the communication control program makes connection to the access point 111 with the highest RSSI among the discovered access points 111 (i.e., the access points 111 from which RSSI have been acquired) on the basis of the result of individual probing of the services in step S14 before ending the process.

As described hereinabove, the PDA 1 makes prioritized connection to the access point with higher priority order on the basis of the profiles.

Now, reference is made to flowcharts in FIG. 7 through FIG. 10 for describing in detail the connection processing in the automatic connection mode. In step S31, the communication control program acquires RSSI of the access points 111. For example, the communication control program instructs the wireless LAN interface 15 to perform probing without specifying SSID, thereby acquiring RSSI of all access points 111 which return SSID. As a result of the process in step S31, the communication control program acquires SSID and RSSI data corresponding thereto.

In step S32, the communication control program reads out a first profile among the profiles which are recorded, for example, in the flash memory 13. In other words, the communication control program reads out the profile with the highest priority order.

In step S33, the communication control program checks if the automatic connection is permitted in the profile, for example, on the basis of the setting value ("yes" or "no" or the like) of automatic connection setting in the read out profile. If it is determined that the automatic connection is permitted, the process goes to step S34 in which it is checked if the access point 111 of the service specified by SSID in the profile is discovered (if RSSI is acquired).

In step S34, if it is determined that the access point 111 of the service as specified by SSID in the profile is discovered, the process goes to step S35 and the communication control program checks if RSSI of the access point 111 exceeds the threshold. The threshold is, for example, stored in advance. It is to be noted, however, that the threshold may be set by the user.

In step S35, if it is determined that RSSI of the access point 111 exceeds the threshold, the process goes to step S36 and the communication control program makes connection to the access point 111.

In step S37, the communication control program checks if the connection is made successfully. If it is determined that the connection was successful, the process goes to step S38 to initiate communication and the process is completed.

In step S37, if it is determined that the connection is not successful, the process goes to step S40 because it is necessary to make connection to the next access point.

If it is determined in step S35 that RSSI of the access point 111 does not exceed the threshold, since the communication conditions are not good, the process goes to step S39 in which the access points whose RSSI are determined not to exceed the threshold are marked (concretely, among SSID and the RSSI data, a mark is added by setting a flag to SSID for the access point 111 which is determined not to exceed the threshold) before going to step S40. By the process in step S39, a marking is made to the stations whose RSSI do not exceed the threshold but RSSI have been acquired.

It is determined in step S33 that the automatic connection is not permitted or if it is determined in step S34 that the access point of service as specified by SSID in the profile is not discovered, since it is impossible to make connection, the process goes to step S40.

In step S40, the communication control program checks if there is any next profile on the basis of the pointer value or the like in the read out profile. If it is determined in step S40 that there is the next profile, the process goes to step S41 in which the communication control program reads out the next profile, i.e., the profile which is the next in the priority order, from the flash memory 13 before returning to step S33. Then, the process in steps S33 through S38 is carried out on the next profile.

As described hereinabove, in steps S31 through S41, RSSI of each access point 111 is acquired at one time and read out the profiles sequentially in the priority order. Since connection to the access point as specified by the read out profile is attempted, it is possible to attempt connection to the access points 111 in the priority order which is set by the user, thereby enabling the user to receive the prioritized services in accordance with the user's preference.

In step S40, if it is determined that there is no next profile, the process goes to step S42 because no stations in excess of the threshold in RSSI could not be discovered in the probing without specifying stations. And the communication control program checks if there is any access point 111 marked in the process in step 39. If it is determined in step S42 that there is any marked access point 111, the process goes to step S43 in which the communication control program selects the access point with the highest RSSI among the marked access points 111.

In step S44, the communication control program makes connection to the selected access point 111. In step S45, the communication control program checks if the connection is made successfully. If it is determined that the connection was successful, the process goes to step S46 to initiate communication before ending the procedure.

On the other hand, if it is determined in step S45 that the connection was not successful or if it is determined in step S42 that there is no marked access points 111, the process goes to step S47 in order to perform processing for making connection to individual stations because connection to the station with the highest RSSI was unsuccessful or no station was available.

In step S47, the communication control program reads out a first profile among the profiles which are recorded, for example, in the flash memory 13. That is, the communication control program reads out the profile with the highest priority order.

In step S48, the communication control program checks if the automatic connection is permitted in the profile on the basis of, for example, the automatic connection setting value ("yes" or "no" or the like) in the read out profile. If it is determined that the automatic connection is permitted, the process goes to step S49 for probing services as specified by SSID in the profile. For example, the communication control program instructs the wireless LAN interface 15 to execute probing as specified by SSID in the profile and to acquire RSSI of the station as specified by SSID.

It is to be noted in step S49 that, since the PDA 1 executes probing of the services as specified by SSID in the profile, it is possible to acquire RSSI for the station even if it is set to hide its SSID.

In step S50, if it is determined that the access point 111 of the services as specified by SSID in the profile is discovered, the process goes to step S51 in which the communication control program checks if RSSI of the access point 111 exceeds the threshold. For example, the threshold is stored in advance. It is to be noted that the threshold may be set by the user. The threshold in step S51 may be the same as or different from the threshold in step S35.

In step S51, if it is determined that RSSI of the access point 111 exceeds the threshold, the process goes to step S52 in which the communication control program makes connection to the access point 111.

In step S53, the communication control program checks if the connection is successful. If it is determined that the connection was successful, the process goes to step S54 to initiate communication before completing the process.

If it is determined in step S53 that the connection was successful, the process goes to step S56 because it is necessary to connect to any next access point.

If it is determined in step S51 that RSSI of the access point 111 does not exceed the threshold, the process goes to step S55 because the communication conditions are not good. The access point 111 is stored in the candidate list (concretely, SSID for the access point 111 is stored in the candidate list) before going to step S56.

It is to be noted in step S55 that a different marking from the marking in step S39 is added to the access point 111 in order to distinguish the access points 111 with poor communication conditions, in which automatic connection is permitted and which are discovered in the individual probing.

If it is determined in step S48 that automatic connection is not permitted or if it is determined in step S50 that the access point 111 of the services as specified by SSID in the profile is not discovered, since it is impossible to make a connection, the process goes to step S56 in which the communication control program checks if there is any next profile on the basis of the value of the pointer or the like in the read out profile. If it is determined in step S56 that there is any next profile, the process goes to step S57 in which the communication control program reads out the next profile, i.e., the next priority order from the flash memory 13 before returning to step S48. And the connection processing in steps S48 through S54 is executed on the next profile.

As apparent from the foregoing, in steps S47 through S57, the profiles are read out in accordance with the priority order and connection to the access points 111 as specified by SSID in the read out profiles are attempted individually. Accordingly, even if setting is made to hide SSID of any access point 111, connection to the access points 111 is attempted in the priority order set by the user, thereby enabling the user to receive services in accordance with the user's preference.

If it is determined that there is no next profile in step S56, it means that no stations exceeding the threshold in RSSI are discovered and the process goes to step S58 in which the communication control program checks if any access point 111 is stored in the candidate list. If it is determined in step S58 that any access point 111 is stored in the candidate list, the process goes to step S59 in which the communication control program selects the access point 111 with the highest RSSI among the access points 111 stored in the candidate list.

In step S60, the communication control program makes connection to the selected access point 111.

In step S61, the communication control program checks if the connection is successful. If the connection is determined to be successful, the process goes to step S62 to initiate communication before completing the process.

If it is determined in step S61 that the connection is not successful or if it is determined in step S58 that no access points 111 are stored in the candidate list, the connection is failed and the process is completed.

It is to be noted that at the time of completing the process in the ad hoc mode, the PDA 1 itself generates an ad hoc network (IBSS) and shifts to a stand-by mode in order to wait for connection from other stations.

Figure 11:
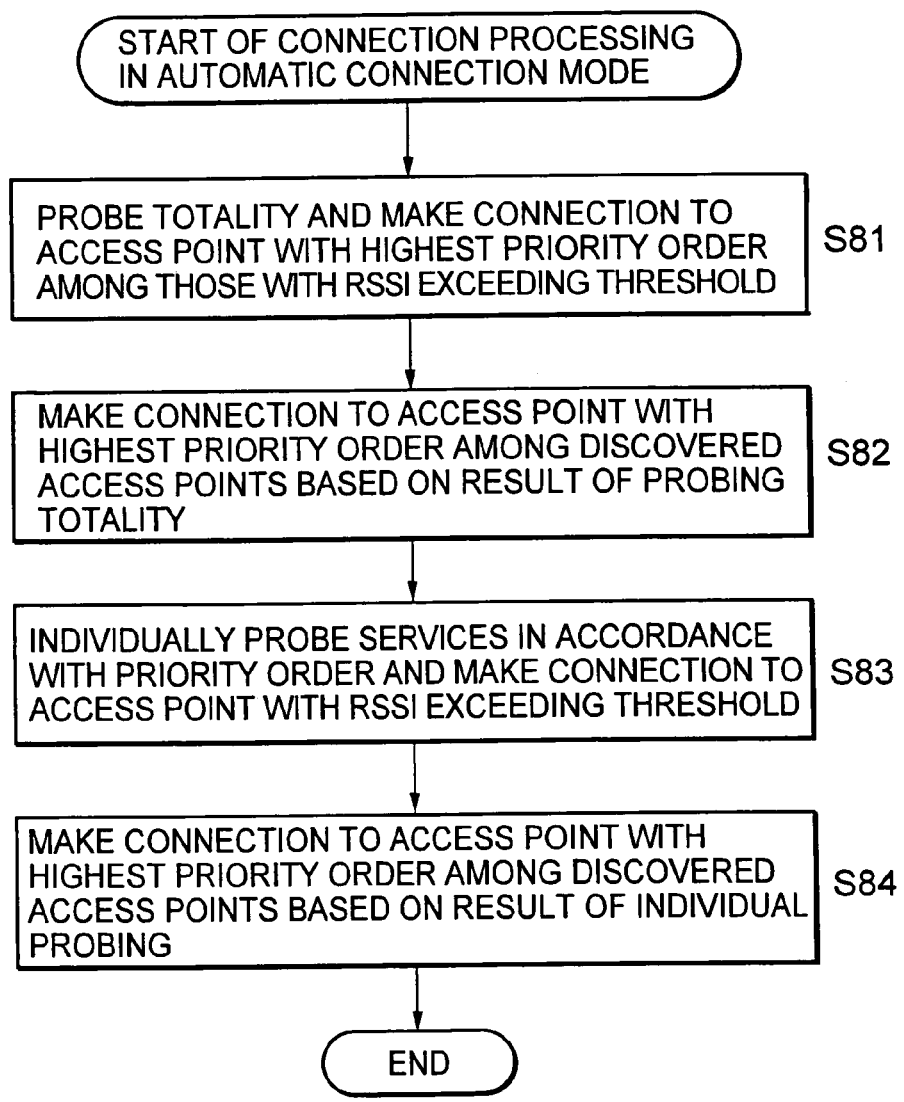
FIG. 11 is a flowchart for roughly explaining another connection processing in the automatic connection mode.

Now, the outline of another connection operation in the automatic connection mode of the PDA 1 which executes the communication control program will be described. FIG. 11 is a flowchart to describe the outline of the other connection processing in the automatic connection mode.

Since the process in step S81 is similar to the one in step S11 in FIG. 6, its description will be omitted.

In a case of connection failure by the process in step S81, the process goes to step S82 in which the communication control program makes connection to the access point 111 with the highest priority order among the discovered access points 111 (among the access points 111 whose RSSI have been acquired) in accordance with the probing result of the totality.

Since the process in step S83 is similar to the one in step S13 in FIG. 6, its description is omitted.

In a case of connection failure in the process in step S83, the process goes to step S84 in which the communication control program makes connection to the access point 111 with the highest priority order among the discovered access points 111 (the access points 111 whose RSSI have been acquired) in accordance with the result of the individual probing of the services before completing the process.

In other words, the details of the other connection processing in the automatic connection mode are basically similar to the processing which is described with reference to the flowcharts in FIG. 7 through FIG. 10. However, it differs in that in the process in step S43 in FIG. 8, the communication control program selects the access point 111 with the highest priority order among the marked access points 111 and that in the process in step S59 in FIG. 10, the communication control program selects the access point 111 with the highest priority order among the access points 111 as stored in the candidate list.

Now, a description will be made on a designated connection mode. In the designated connection mode, a single profile is designated by the user. The PDA 1 makes a connection to the designated station which is designated in the designated profile. In this case, the PDA 1 does not perform the probing processing without specifying SSID but performs the probing processing with specified SSID before subsequently attempting connection.

Figure 12:
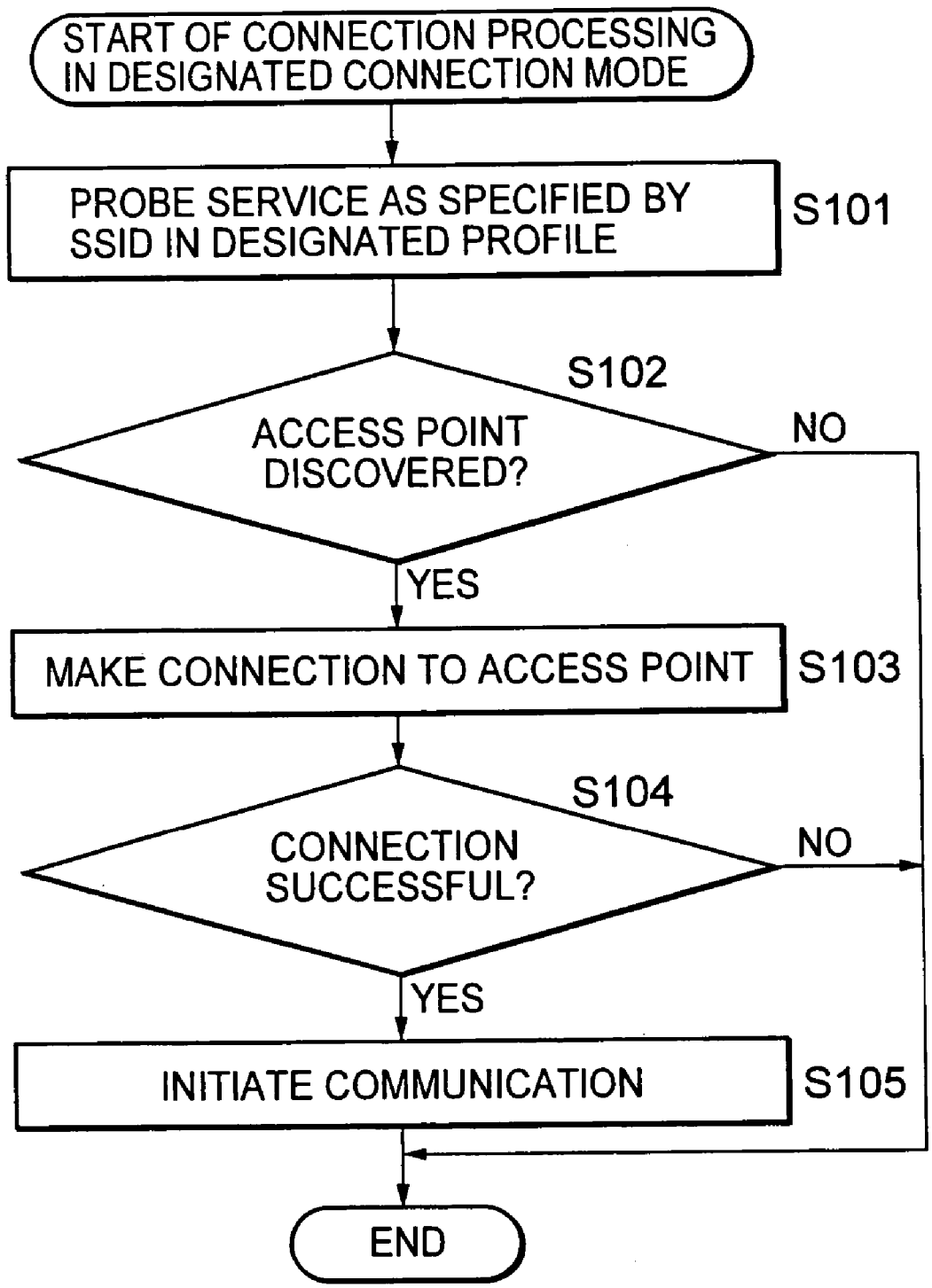
FIG. 12 is a flowchart for explaining a connection processing in a designated connection mode.

FIG. 12 is a flowchart for describing the connection processing in the designated connection mode by the PDA 1 which executes the communication control program.

In step S101, the communication control program performs probing of the services which are specified by SSID in the designated profile. Since the PDA 1 performs probing of the services which are specified by SSID in the profile, it is possible to discover stations which are set to hide their SSID.

In step S102, the communication control program checks if the access point 111 which is specified by SSID in the designated profile is discovered (i.e., if a response is received).

If it is determined in step S102 that the access point 111 for the service which is specified by SSID is discovered in the designated profile, the process goes to step S103 in which the communication control program makes connection to the access point 111.

In step S104, the communication control program checks if the connection is successful. If it is determined that the connection is successful, the process goes to step S105 to initiate communication before completing the process.

If it is determined in step S104 that the connection is not successful or if it is determined in step S102 that the access point 111 for the service which is specified by SSID in the designated profile is not discovered, the process is completed.

As described hereinabove, it is possible to make a connection to the desired station for receiving desired services by simply designating the profile.

It is to be noted in the designated connection mode or the automatic connection mode (excluding the ad hoc mode) that, if the connection processing is terminated without making connection to a station, the connection process will be repeated at a designated time interval.

Although the PDA 1 has been described as an example of the communication apparatus, the apparatus should not be restricted to the PDA but may be other apparatus having a communication function such as a personal computer, a cellular phone and the like.

As described hereinabove, in a case of making a connection to stations with RSSI in excess of the threshold, it is possible to make connection to any station with good communication conditions. In a case of setting the priority order of the stations and controlling to acquire RSSI of the stations so as to make a connection to the stations in accordance with the priority order among those with their RSSI in excess of the designated threshold, it is also possible for the user to easily and quickly make a connection to the desired station with good communication conditions.

A series of processes as described hereinabove can be executed not only by hardware but also by software. In a case of executing the series of processes by software, programs constituting such software are installed from a recording medium into a computer including dedicated hardware or, for example, a general purpose computer capable of performing various functions by installing various programs.

The recording medium comprises not only package media such as a magnetic disk (including a flexible disk) 61, an optical disc (including a CD-ROM (Compact Disc-Read Only Memory), a DVD (Digital Versatile Disc)) 62, a magneto optical disc (MD (Mini-Disc) (trademark)) 63, a semiconductor memory 64 or the like which is distributed for the purpose of providing programs to the user in separated from the computer as shown in FIG. 1 but also a ROM, a hard disk or the like in which the programs are stored and provided with the user in a condition preinstalled in a computer.

It is to be noted that the programs to execute the above-mentioned series of processes may be installed in a computer by way of wired or wireless communication medium such as a local area network, the Internet, digital satellite broadcasting or the like through an interface such as a router, a modem or the like if necessary.

Also, it is to be noted in this specification that the steps for describing the programs which are stored in the recording medium are not restricted to the time sequence as described herein but may not necessarily be in the time sequence and may include a process to be executed in parallel or individually.

It is to be noted in this specification that the term "system" represents the entire apparatus comprising a plurality of devices and the like.

What is claimed is:

1. A communication apparatus, comprising:
setting means for setting a priority order of wireless communication stations;
acquisition control means for controlling acquisition of RSSI (Receive Signal Strength Indication) of each of said stations; and
connection control means for controlling a connection to one of said stations having a highest priority order among said stations whose RSSI exceeds a predetermined threshold, wherein
said setting means further sets whether or not an automatic connection can be made to various ones of said stations,
said connection control means reads a profile of at least one of said stations, the profile including an automatic connection setting indicating whether the automatic connection is permitted, and
said connection control means controls connection to one of said stations having a highest priority order among said stations to which the automatic connection is permitted depending upon a setting and whose RSSI exceeds the predetermined threshold.

2. The communication apparatus according to claim 1, wherein said connection control means controls connection to one of said stations with a highest RSSI, in a case where there is no station which exceeds the predetermined threshold.

3. The communication apparatus according to claim 1, wherein said connection control means controls connection to one of said stations having a highest priority order among said stations whose RSSI has been acquired.

4. The communication apparatus according to claim 1, wherein, in a case where a particular one of said stations is designated:
said acquisition control means controls acquisition of RSSI of the designated one of said stations, and
said connection control means controls connection to the designated one of said stations.

5. The communication apparatus according to claim 1, wherein said acquisition control means controls to acquire said RSSI of said stations at one time.

6. The communication apparatus according to claim 1, wherein said acquisition control means controls to acquire said RSSI of said station sequentially in accordance with said priority order.

7. A communication method, comprising:
setting a priority order of wireless communication stations;
an acquisition control step of controlling acquisition of RSSI (Receive Signal Strength Indication) of each of said stations; and
controlling a connection to one of said station having a highest priority order among said stations whose RSSI exceeds a predetermined threshold, wherein
said setting further sets whether or not an automatic connection can be made to various ones of said stations,
reading a profile of at least one of said stations, the profile including an automatic connection setting indicating whether the automatic connection is permitted, and
said controlling controls connection to one of said stations having a highest priority order among said stations to which the automatic connection is permitted depending upon a setting and whose RSSI exceeds the predetermined threshold.

8. A computer readable medium encoded with a computer program configured to cause a processor to execute a method, the method comprising:
setting a priority order of wireless communication stations;
an acquisition control step of controlling acquisition of RSSI (Receive Signal Strength Indication) of each of said stations; and
controlling a connection to one of said station having a highest priority order among said stations whose RSSI exceeds a predetermined threshold, wherein
said setting further sets whether or not an automatic connection can be made to various ones of said stations,
reading a profile of at least one of said stations, the profile including an automatic connection setting indicating whether the automatic connection is permitted, and
said controlling controls connection to one of said stations having a highest priority order among said stations to which the automatic connection is permitted depending upon a setting and whose RSSI exceeds the predetermined threshold.

9. A communication apparatus, comprising:
a setting unit configured to set a priority order of wireless communication stations;

an acquisition control unit configured to control acquisition of RSSI (Receive Signal Strength Indication) of each of said stations; and a connection control unit configured to control a connection to one of said stations having a highest priority order among said stations whose RSSI exceeds a predetermined threshold, wherein said setting unit is further configured to set whether or not an automatic connection can be made to various ones of said stations, said connection control unit is further configured to read a profile of at least one of said stations, the profile including an automatic connection setting indicating whether the automatic connection is permitted, and said connection control unit is further configured to control connection to one of said stations having a highest priority order among said stations to which the automatic connection is permitted depending upon a setting and whose RSSI exceeds the predetermined threshold.

* * * * *